United States Patent Office 3,510,209
Patented May 5, 1970

3,510,209
SOUND RECORDING FOR MOTION PICTURE
Milo P. Hnilicka, Jr., Concord, Mass., assignor to National Research Corporation, Newton, Mass., a corporation of Massachusetts
Filed Sept. 8, 1966, Ser. No. 578,009
Int. Cl. G03b 31/02
U.S. Cl. 352—27         6 Claims

ABSTRACT OF THE DISCLOSURE

Apparatus for recording accompanying sound tracks simultaneously with the recording of motion pictures and during the cyclic transport time of the film. The sound tracks are located between adjacent picture frames and extend transversely of the longitudinal length of the film. An electroluminescent diode light source is mounted on the claw mechanism such that it moves with the claw in a direction longitudinally of the film. The light source moves transversely of the film during the period when the film is at rest and also during a portion of the time when the film is being moved to the next frame.

The present invention relates to the production of motion pictures with accompanying sound tracks.

BACKGROUND OF THE INVENTION

The conventional method for recording a motion picture sound track is to space the corresponding visual and sound sections of the film apart to allow a series of visual frames to be driven past the picture taking shutter with a series of intermittent stops for taking a series of still pictures while driving the corresponding sound tracks past a recording head at constant speed. This involves a complex mechanical drive problem.

OBJECT OF THE INVENTION

It is therefore the object of the invention to provide a method and apparatus for recording sound on motion picture films which eliminates the need for driving a portion of the film at constant speed and results in a less complex and more compact arrangement.

GENERAL DESCRIPTION

Motion pictures with sound are made by exposing a series of picture frames in cyclic fashion with the film being stopped for a portion of each cycle and advanced during a portion of each cycle. Photographic sound track portions are located between adjacent picture frames and extend transverse to the film. The sound tracks are written by exposure to an electroluminescent light source whose light output is controlled as a function of the audio input. The light source is moved parallel to each sound track to write the sound image on the track. The movement of the light source continues during both the stationary and moving portions of the film transport cycle. The light source moving device is tied to the film advancing mechanism to assure that the light source can follow the movement of the film exactly to maintain alignment with the sound track portion being recorded while at the same time moving parallel to the track. Each sound track is located adjacent its corresponding picture frame.

DESCRIPTION OF THE INVENTION

Figure 1:
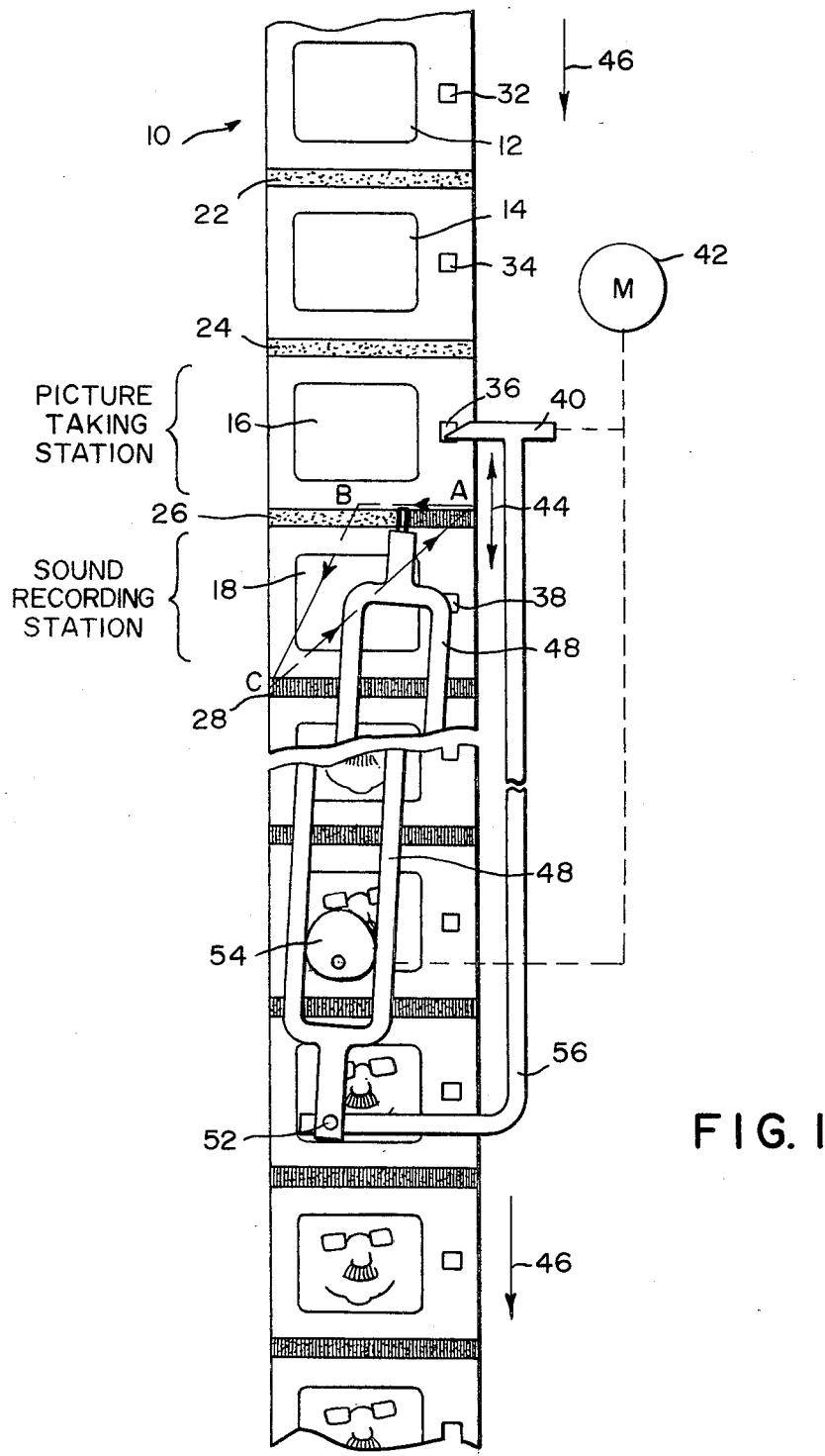

The invention is now described with reference to the FIGS. 1 and 2 drawings which are schematic representations of a film being recorded. In FIG. 1 a first embodiment of the invention comprising one light source is shown and in FIG. 2 a second embodiment of the invention comprising two light sources is shown.

Referring now to FIG. 1, the film is indicated by the reference numeral 10. It contains a series of picture frames 12, 14, 16, 18, etc. Adjacent each frame is a corresponding sound track 22, 24, 26, 28, etc. Sprocket holes 32, 34, 36, 38, etc., are also associated with each frame and have a pitch interval consistent with ASA standards. The film is cyclically advanced, with cyclic stops, by a pawl 40 which engages the sprocket holes. The pawl is driven by a motor 42 and cycles back and forth as indicated by the arrow 44. When the pawl is moving downward, it engages a sprocket hole and moves the film by a single frame pitch interval. When the pawl moves upwardly it clears the film. During each cycle the pawl 40 has a dwell period where it engages a sprocket hole adjacent the frame being recorded at the picture taking station to insure good alignment with the lens and freedom from movement of the film. At the moment shown in FIG. 1, the film 10 is stationary and a latent picture image is being recorded on frame 16. (Frame 18 has already been recorded and frames 12 and 14 have not been recorded yet.) After the picture is taken, the pawl will advance the film as shown by the arrows 46.

The sound recording is accomplished by an electroluminescent diode 50 whose light output is controlled by the audio input of the sound being recorded via an electric circuit (not shown). The diode is of the type described in the copending application of Miller and Vitkus, S.N. 556,408, filed June 9, 1966. At the instant shown in the drawing, the diode is recording on sound track 26 (sound track 28 has already been recorded and sound tracks 22 and 24 have not been recorded yet). The diode is mounted on supporting arm 48 which is driven pivotally back and forth about a pivotal axis 52 by a cam 54. The cam is driven in synchronism with pawl 40. The motion of the diode also includes a longitudinal component because its pivot 52 is suspended from the pawl 40 by an arm 54.

Thus, at the instant shown in the drawing, the diode 50 is moving along the line A–B and parallel to the sound track 26. By the time the diode reaches B, the pawl 40 begins to move and the diode 50 moves downwardly along with the film and also continues to sound track 26. This compound motion is indicated by the line B–C. At the end of this motion the diode returns to its starting point by moving along the line C–A. The light output of the diode is cut off (e.g. by a commutator) during retrace from C to A.

It will be understood that the picture sites 12 and 14 are only potential picture sites and that the sound track sections 22 and 24 are only potential sound track sites. These sites would not be any different from the surrounding film until exposed at the picture taking station and sound recording station respectively.

Figure 2:
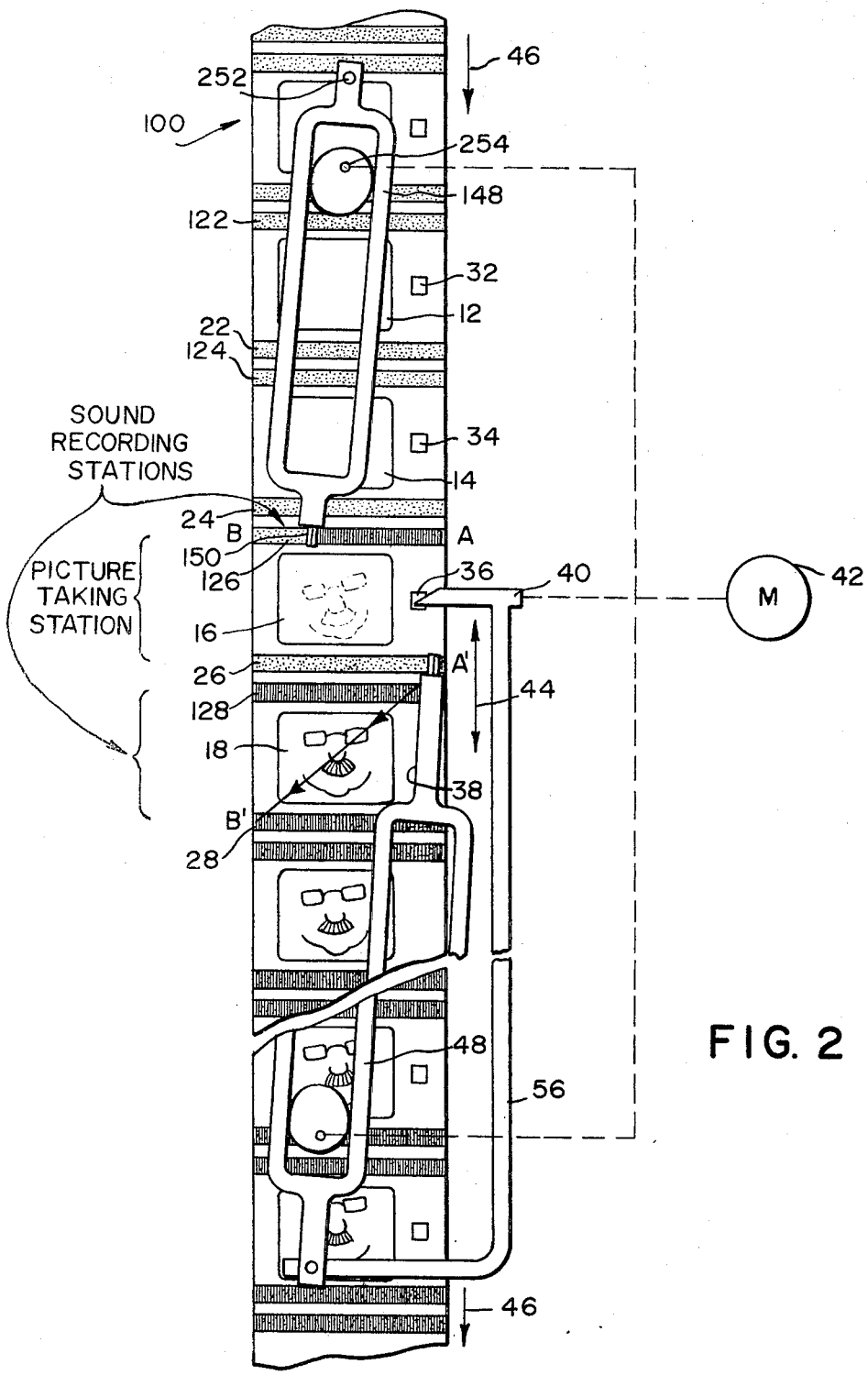

Referring now to FIG. 2, a second embodiment of the invention is shown. The film 100 here is similar to film 10 of FIG. 1 in that film 100 has the picture frames 12, 14, 16, 18, etc. and the sound tracks 22, 24, 26, 28, etc., and sprocket holes 32, 34, 36, 38, etc. Film 100 differs from film 10 in that film 100 also comprises a second sound track 122, 124, 126, 128, etc., associated with each frame. A second light source diode 150 is added in FIG. 2 along with a second supporting arm 148 which is driven by a cam 254 and mounted on a fixed pivot 252. The cam 54 of FIG. 1 is replaced in FIG. 2 by a cam 154. The pawl 40, arm 56 and motor 42 are the same as in FIG. 1.

At the moment shown in F the film 100 is stationary and a latent picture image is being recorded on frame 16. After the picture is taken, the pawl will advance the film as shown by the arrows 46. The sound recording diode 150 will traverse from A to B during this cyclic stop time of the film making a sound record on track 126 as it goes. During the transport portion of the cycle, the diode will retrace from B to A with its light output cut off. During that cycle transport time diode 50 will traverse the film writing a continuation of the sound record on track 26 as it goes. At the same time, the pawl 40, via arm 56, drops the pivot 52 so that diode 50 follows the longitudinal movement of the film, the net motion of the diode being from A' to B'. When the pawl 40 quickly retracts to the next sprocket the diode 50 follows with it and at the same time retrace from left to right to get back to the position shown in the drawing.

The apparatus and method exemplified by the above embodiments have several advantages. They eliminate the need for complex constant speed film drive. The constant speed diode drive is less complex because the diode(s) needs only a low moment of inertia moving mechanism. The compactness of the sound recording structure allows the elimination of image/sound separation, thus reducing synchronization and editing problems. This also simplifies the use of cartridges or magazines since a simple auxiliary aperture(s) can be placed next to the picture opening of the cartridge for accommodating the sound track. The frequency response and fidelity of sound recorded according to the present invention will be better than conventional sound films since the film width is about twice the picture length, thus making available twice the sound track length (and in the two track arrangement of FIG. 2 four times the sound track length) and twice (or four times) the recording speed.

In the embodiment of FIG. 1 there is an interruption in the sound information while the diode 50 moves from C to A. This interruption is not noticeable by the human ear. In the embodiment of FIG. 2 there is essentially no interruption of sound information.

Several variations can be made from the above-described embodiments without departing from the scope of the invention. It is therefore intended that the above description shall be read as illustrative and not in a limiting sense.

What is claimed is:

1. In apparatus for producing motion pictures and photographic sound records concurrently upon the same photographic film which consists of means for moving a photographic film through a camera with an intermittent advance motion so that a series of picture sections on the film are successively stopped adjacent a picture recording station and means for transporting the film by a standard pitch interval of distance between stops in cyclic fashion and means for simultaneously writing a sound record on a sound track portion of the film corresponding to the picture being recorded, the improvement comprising a light source means for writing said sound record and driving means for displacing said light source means with respect to the film and parallel to the sound track during the cyclic stop time of the film and during at least a portion of the cyclic transport time and wherein two light sources are provided in said light source means and wherein the driver means drives at least one of said light sources during the cyclic stop time of the film to record a portion of the sound track corresponding to a picture and the other of said light sources during the cyclic transport time to record another portion of the sound track corresponding to the same picture.

2. The apparatus of claim 1 wherein the sound track is a series of tracks extending transversely of the long dimension of the film.

3. The apparatus of claim 1 wherein the sound tracks are located adjacent their corresponding pictures.

4. The apparatus of claim 1 wherein the light source means comprises at least one electroluminescent diode.

5. In apparatus for producing motion pictures and photographic records concurrently upon the same photographic film surface which consists of means for moving a photographic film through a camera with an intermittent advance motion so that a series of picture sections on the film are successively stopped adjacent a picture recording station, means for transporting the film by a standard pitch interval between stops in cyclic fashion, and means for simultaneously writing a sound record on a sound track portion of the film extending transversely of the long dimension of the film between adjacent picture frames and corresponding to the picture being recorded and being on the same film surface therewith, the improvement comprising a single portable electroluminescent diode light source for writing said sound record and driving means for displacing said light source transversely with respect to the film and parallel to the sound track during the cyclic stop time of the film and during at least a portion of the cyclic transport time, the driving means including means for cyclically returning the light source to an initial position and means for operating the light source to expose the sound track portion of the film surface during displacement and to prevent the film surface from being exposed to the light source during return.

6. The apparatus of claim 5 wherein the sound tracks are located adjacent their corresponding pictures.

References Cited

UNITED STATES PATENTS

| | | | |
|---|---|---|---|
| 3,001,030 | 9/1961 | Maurer | 179—100.3 |
| 3,046,836 | 7/1962 | Schwartz et al. | 352—27 |
| 3,051,042 | 8/1962 | Maurer | 352—27 |
| 3,379,095 | 4/1968 | Kaprelian | 352—35 |
| 2,144,738 | 1/1939 | Musumeci | 352—26 |

FOREIGN PATENTS 337,151  10/1930  Great Britain.

NORTON ANSHER, Primary Examiner

M. H. HAYES, Assistant Examiner

U.S. Cl. X.R.

352—37; 179—100.3